United States Patent
Oberg et al.

(10) Patent No.: US 7,623,789 B2
(45) Date of Patent: Nov. 24, 2009

(54) LOW LOSS WDM ADD DROP NODE

(75) Inventors: Magnus Oberg, Hagersten (SE); Ulf Persson, Skogas (SE)

(73) Assignee: Transmode Holding AB, Hagersten (SE)

( * ) Notice: Subject to any disclaimer, the term of this patent is extended or adjusted under 35 U.S.C. 154(b) by 289 days.

(21) Appl. No.: 10/275,889

(22) PCT Filed: Apr. 11, 2002

(86) PCT No.: PCT/SE02/00735

§ 371 (c)(1),
(2), (4) Date: Dec. 24, 2002

(87) PCT Pub. No.: WO02/084915

PCT Pub. Date: Oct. 24, 2002

(65) Prior Publication Data

US 2003/0128984 A1 Jul. 10, 2003

Related U.S. Application Data

(60) Provisional application No. 60/288,422, filed on May 4, 2001.

(30) Foreign Application Priority Data

Apr. 11, 2001 (SE) .................................. 0101300

(51) Int. Cl.
*H04J 14/02* (2006.01)
*H04B 10/02* (2006.01)

(52) U.S. Cl. ............................. 398/85; 398/83; 398/87; 398/59

(58) Field of Classification Search ................ 398/72, 398/79, 48, 82–85, 87, 66–68, 59, 41–43
See application file for complete search history.

(56) References Cited

U.S. PATENT DOCUMENTS 4,923,270 A * 5/1990 Carter ........................ 385/24

(Continued)

FOREIGN PATENT DOCUMENTS

EP 0729248 A2 8/1996

(Continued)

OTHER PUBLICATIONS

Hitoshi Obara et al., 11$^{th}$ International Conference on Integrated Optics and Optical Fibre Communications 23 European Conference on Optical Communications IOOC-ECOC97, Edinburgh, UK, Sep. 22-25, 1997, vol. 4, pp. 9-12.

(Continued)

*Primary Examiner*—M. R. Sedighian
(74) *Attorney, Agent, or Firm*—Birch, Stewart, Kolasch & Birch, LLP

(57) ABSTRACT

In an optical fiber network bidirectional WDM traffic is sent on one optical main transmission fiber (1) between two nodes (A, B) connected in the path of the transmission fiber. The bidirectional traffic between a pair of nodes is carried on two different wavelength channels (Nos. 1, 2), one for each direction. The two wavelength channels are added to/dropped from the traffic in the ring fiber (1) in each node using a two-channel add/drop filter ($5_{e1-2}$, $5_{w1-2}$), e.g. a band add/drop filter. In this way the number of add/drop filters connected in the path of the transmission fiber can be kept as small as possible.

22 Claims, 16 Drawing Sheets

U.S. PATENT DOCUMENTS

| | | | | |
|---|---|---|---|---|
| 5,600,473 | A * | 2/1997 | Huber | 398/87 |
| 5,633,741 | A * | 5/1997 | Giles | 398/79 |
| 5,726,785 | A * | 3/1998 | Chawki et al. | 398/84 |
| 5,793,908 | A * | 8/1998 | Mizuochi et al. | 385/24 |
| 5,805,751 | A * | 9/1998 | Kewitsch et al. | 385/43 |
| 5,940,551 | A * | 8/1999 | Oberg | 385/17 |
| 5,963,348 | A * | 10/1999 | Oberg | 398/5 |
| 6,049,405 | A * | 4/2000 | Oberg | 398/1 |
| 6,061,484 | A * | 5/2000 | Jones et al. | 385/24 |
| 6,122,095 | A * | 9/2000 | Fatehi | 359/337 |
| 6,122,096 | A * | 9/2000 | Fatehi | 359/337.21 |
| 6,130,765 | A * | 10/2000 | Gautheron et al. | 398/1 |
| 6,144,784 | A * | 11/2000 | Shigehara et al. | 385/24 |
| 6,208,443 | B1 * | 3/2001 | Liu et al. | 398/9 |
| 6,215,583 | B1 * | 4/2001 | Lagerstrom et al. | 359/341.1 |
| 6,243,177 | B1 * | 6/2001 | Duerksen | 398/9 |
| 6,281,998 | B1 * | 8/2001 | Jones et al. | 398/9 |
| 6,288,810 | B1 * | 9/2001 | Grasso et al. | 398/9 |
| 6,288,812 | B1 * | 9/2001 | Duerksen | 398/9 |
| 6,333,798 | B1 * | 12/2001 | Allan et al. | 398/9 |
| 6,339,663 | B1 * | 1/2002 | Leng et al. | 385/24 |
| 6,348,985 | B1 * | 2/2002 | Jiang et al. | 398/82 |
| 6,381,384 | B2 * | 4/2002 | Solheim et al. | 385/24 |
| 6,445,840 | B1 * | 9/2002 | Fernandez et al. | 385/17 |
| 6,445,841 | B1 * | 9/2002 | Gloeckner et al. | 385/17 |
| 6,449,072 | B1 * | 9/2002 | Sian et al. | 398/82 |
| 6,449,406 | B1 * | 9/2002 | Fan et al. | 385/17 |
| 6,453,083 | B1 * | 9/2002 | Husain et al. | 385/17 |
| 6,493,117 | B1 * | 12/2002 | Milton et al. | 398/49 |
| 6,529,314 | B1 * | 3/2003 | Shukunami et al. | 359/332 |
| 6,529,656 | B2 * | 3/2003 | Lee et al. | 385/24 |
| 6,532,106 | B2 * | 3/2003 | Chung et al. | 359/341.2 |
| 6,583,901 | B1 * | 6/2003 | Hung | 398/79 |
| 6,583,934 | B2 * | 6/2003 | Kramer | 359/569 |
| 6,587,239 | B1 * | 7/2003 | Hung | 398/79 |
| 6,590,681 | B1 * | 7/2003 | Egnell et al. | 398/82 |
| 6,616,348 | B1 * | 9/2003 | Barnard | 398/3 |
| 6,650,809 | B2 * | 11/2003 | He et al. | 385/24 |
| 6,687,463 | B1 * | 2/2004 | Hutchison et al. | 398/83 |
| 6,701,085 | B1 * | 3/2004 | Muller | 398/4 |
| 6,708,000 | B1 * | 3/2004 | Nishi et al. | 398/1 |
| 6,721,509 | B2 * | 4/2004 | Xiao et al. | 398/83 |
| 6,782,204 | B1 * | 8/2004 | Thomas et al. | 398/85 |
| 6,816,681 | B2 * | 11/2004 | Li et al. | 398/27 |
| 6,832,017 | B2 * | 12/2004 | Lee et al. | 385/24 |
| 6,879,441 | B1 * | 4/2005 | Mossberg | 359/569 |
| 6,959,129 | B2 * | 10/2005 | He et al. | 385/24 |
| 6,973,229 | B1 * | 12/2005 | Tzathas et al. | 385/16 |
| 2001/0028757 | A1 * | 10/2001 | Lee et al. | 385/24 |
| 2001/0038478 | A1 * | 11/2001 | Hwang | 359/124 |
| 2001/0050804 | A1 * | 12/2001 | Chung et al. | 359/341.2 |
| 2002/0039212 | A1 * | 4/2002 | Lee et al. | 359/127 |
| 2002/0041411 | A1 * | 4/2002 | Persson et al. | 359/124 |
| 2002/0114035 | A1 * | 8/2002 | Graves et al. | 359/128 |
| 2002/0174207 | A1 * | 11/2002 | Battou | 709/223 |
| 2002/0176131 | A1 * | 11/2002 | Walters et al. | 359/118 |
| 2003/0053163 | A1 * | 3/2003 | Li et al. | 359/110 |
| 2003/0128984 | A1 * | 7/2003 | Oberg et al. | 398/83 |
| 2004/0141746 | A1 * | 7/2004 | Oberg | 398/59 |
| 2004/0175071 | A1 * | 9/2004 | Oberg | 385/24 |
| 2005/0084262 | A1 * | 4/2005 | Oberg et al. | 398/19 |

FOREIGN PATENT DOCUMENTS

| | | |
|---|---|---|
| EP | 0 977 394 A2 | 2/2000 |
| EP | 0977394 A2 * | 2/2000 |
| JP | 8-265299 A | 10/1996 |
| JP | 10-153721 A | 6/1998 |
| JP | 11-186960 A | 7/1999 |
| JP | 2001-103007 A | 4/2001 |
| WO | WO 99/41857 A2 | 8/1999 |
| WO | WO 0161871 A2 | 8/2001 |

OTHER PUBLICATIONS

Takashi Mizuochi et al., Journal of Lightwave Technology, vol. 16, No. 2, Feb. 1998, pp. 265-276.

Y. Zhao et al., *IEEE Photonics Technology Letters*, vol. 11, No. 9, (Sep. 1999), pp. 1180-1182.

Keang-Po Ho et al., *IEICE Trans. Commun.*, vol. 83-B, No. 10, (Oct. 2000), pp. 2245-2252.

* cited by examiner

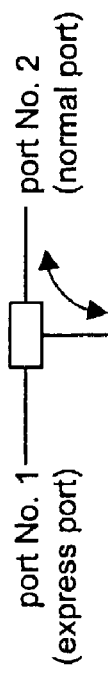
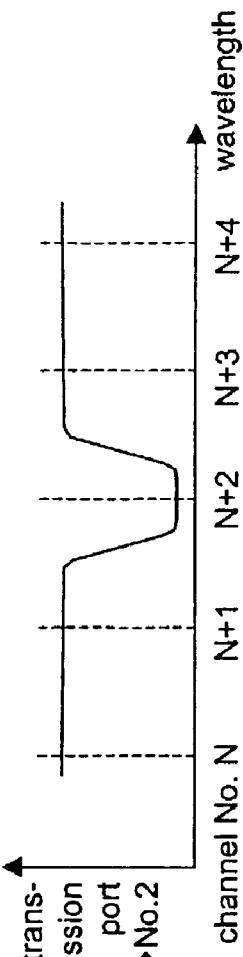
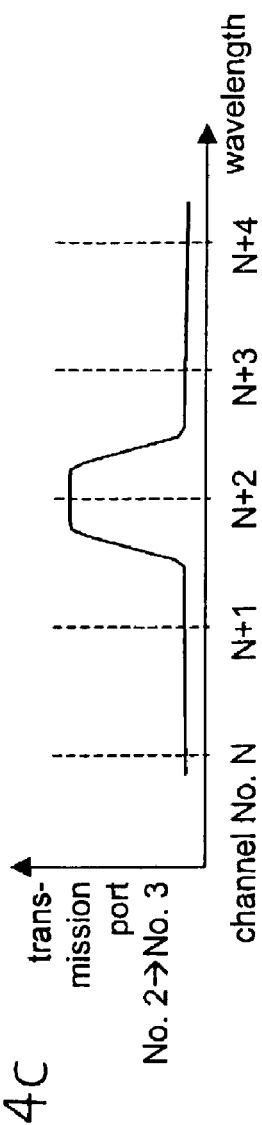
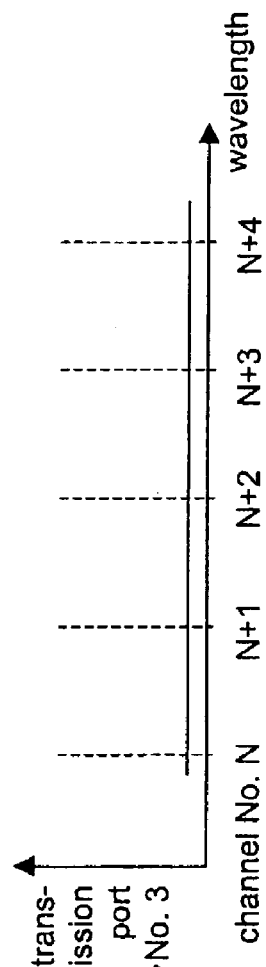

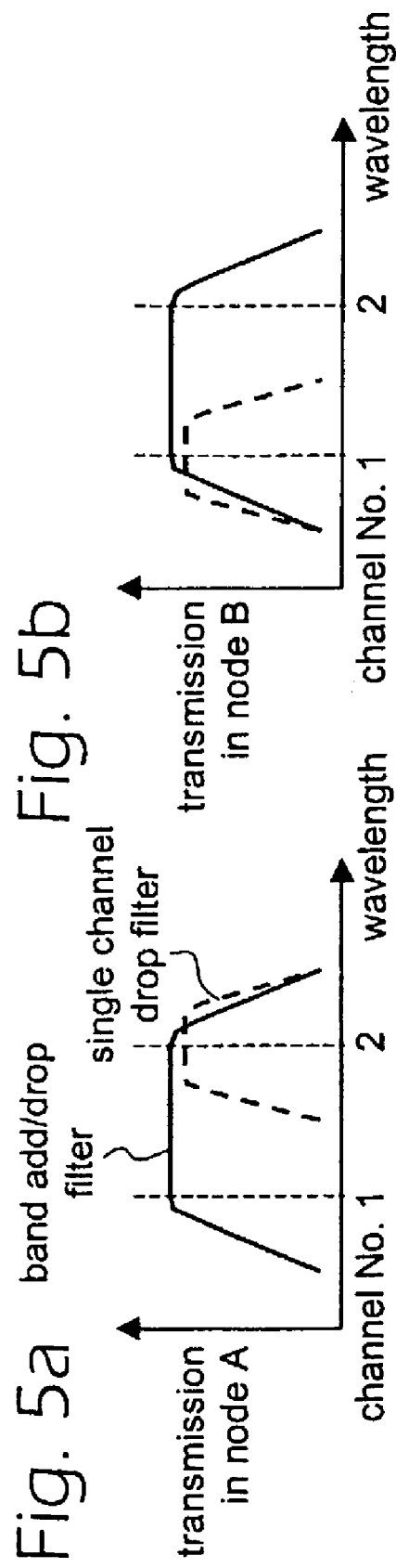

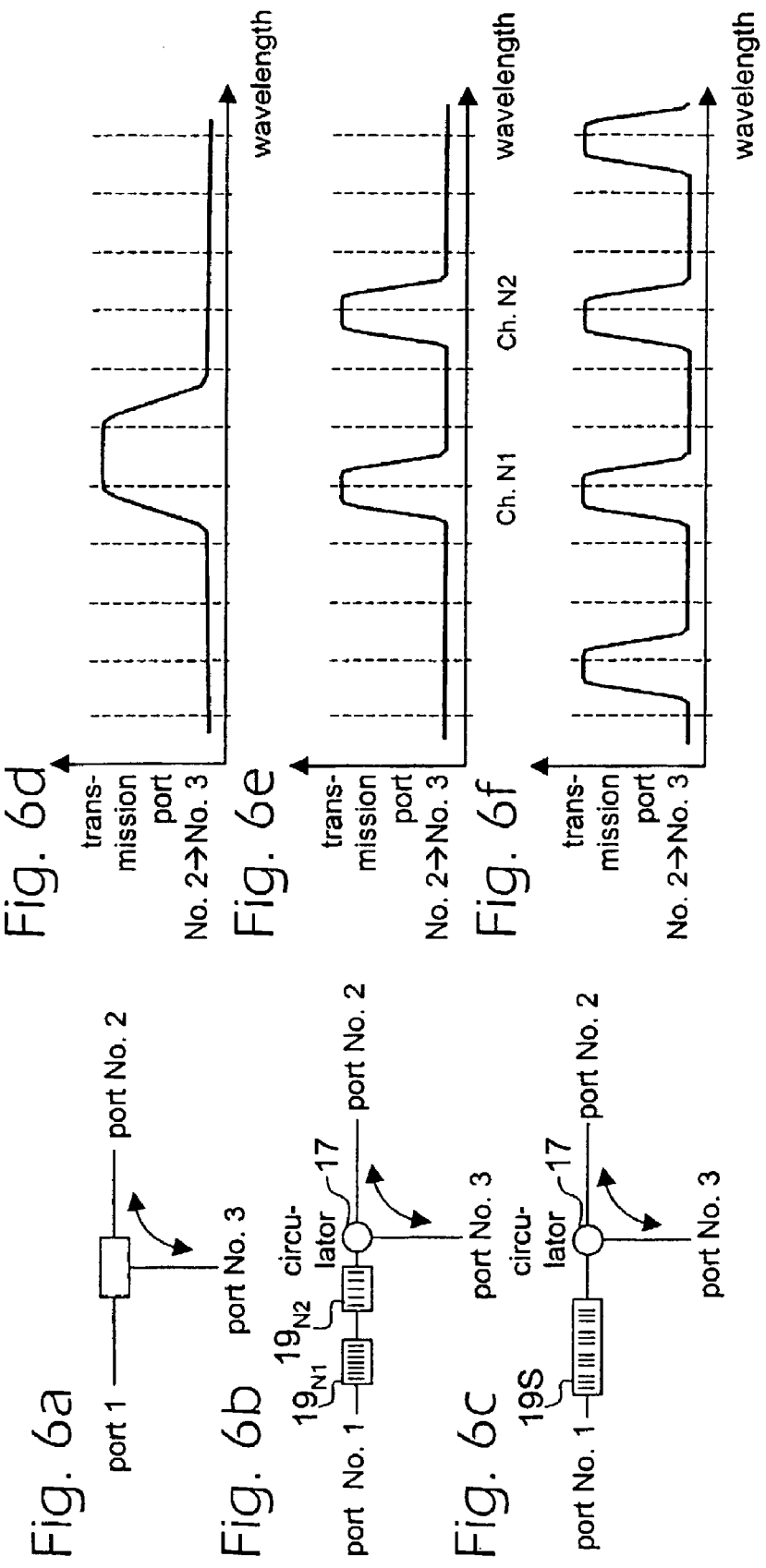

LOW LOSS WDM ADD DROP NODE

RELATED APPLICATIONS

This application claims priority and benefit from Swedish patent application No. 0101300-2, filed Apr. 11, 2001 and U.S. provisional patent application No. 60/288,422, filed May 4, 2001, the entire teachings of which are incorporated herein by reference.

This application is the national phase under 35 U.S.C. § 371 of PCT International Application No. PCT/SE02/00735 which has an International filing date of Apr. 11, 2002, which designated the United States of America.

FIELD OF THE INVENTION

The present invention relates to a node structure for bidirectional optical communication and to networks including nodes having such a structure.

BACKGROUND

Wavelength division multiplexing (WDM) is a method used to transport several independent optical signals on one optical fiber. WDM can be used for point-to-point communication where two nodes, one in each end of the fiber, are connected, or for multipoint-to-multipoint communication where several nodes share the transmission capacity on one fiber or on a pair of fibers. In the case of multipoint-to-multipoint communication the fiber or fibers used usually forms a closed loop, a ring, in order to have two different routes between a pair of nodes in the case of fiber or other equipment failure. Bus networks in which the end nodes are located at different places are also possible. An example of an add-drop node in such a ring or bus WDM network is given in the published European patent application 0905936.

A schematic of a WDM ring network is shown in FIG. 1. The traffic in the two parallel ring fibers or fiber paths 1a, 1b goes in opposite directions and each fiber path carries traffic in one direction only. In the nodes 3 wavelength selective optical add and drop ("add/drop") filters, not shown, are provided that allow a selected wavelength channel to be added/dropped to/from a ring fiber with a low loss, and let all other wavelength channels pass along the ring fiber, through the node, with a low loss. In FIG. 1 the arrows 41, 42 in and out of the nodes symbolize interfaces for the payload portion of the information transported in the ring network.

In FIG. 2 is illustrated how bidirectional communication between a pair of nodes, nodes A and B, is achieved using unidirectional communication on each of two transmission fibers 1a, 1b. Usually the same wavelengths are used for the light signals on the two fibers. Totally four add or drop filters connected in the transmission fibers 1a, 1b are needed. It has also been proposed to use bidirectional communication using a single optical transmission fiber. Such communication in a single fiber ring network is disclosed in the article by Hitashi Obara, Hiroji Masuda and Kazuo Aida, "Transmission over a 200-km single-fiber bidirectional ring network with reconfigurable WDM add/drop repeaters", 11th International Conference on Integrated Optics and Optical Fibre Communications 23 European Conference on Optical Communications IOOC-ECOC97, Edinburgh, UK, Sep. 22-25, 1997, pp. 9-12. Bidirectional add/drop multiplexers B-ADMs are used that each contain two four-port circulators directly connected in series with each other. One circulator transmits from the B-ADM in a first direction, e.g. to the left, and receives from the same direction, e.g. from the left, and the other circulator transmits from the B-ADM in a second direction, e.g. to the right, and receives from the same direction, e.g. from the right. Two branches of the circulators are through filters connected to an add port and a drop port, respectively, of the B-ADM.

Furthermore, in the published European patent application No. 0 729 248 for AT&T, inventor Giles, bidirectional communication over a single fiber between two terminals is disclosed. Channels can be added and dropped in bidirectional amplifiers or in add/drop multiplexers. In such a bidirectional amplifier two four-port circulators are used that each have a first port connected in the single fiber path, second and third ports connected to each other through conventional optical fiber amplifiers and a fourth port connected to add and drop ports through an optical power coupler. In the branch to the coupler gratings are connected. An add/drop multiplexer comprises two six-port circulators interconnected by fiber paths comprising filters at two of their ports.

SUMMARY

It is an object of the invention to provide an optical network having add/drop nodes connected in a transmission path in which nodes the losses for traffic in the transmission path passing the add/drop nodes are as small as possible.

It is another object of the invention to provide add/drop nodes for connection in a transmission path in an optical network having a simple structure and allowing bidirectional communication between the nodes.

Thus, in an optical fiber network bidirectional WDM traffic between two nodes on one fiber only is allowed, the fiber e.g. being a main transmission fiber or fiber path in the network having e.g a ring configuration. Each bidirectional communication channel between a pair of nodes is carried on two different wavelength channels, one for each transmission direction in the fiber. The wavelengths of the two channels are added to/dropped from the traffic in the ring fiber using one common, wavelength selective add/drop filter, generally a two channel add/drop filter which can e.g. be a band add/drop filter, the band of which covers two adjacent channels. In this way the number of add/drop filters on the transmission fiber is not larger than the amount of filters needed on each transmission fiber on a WDM ring according to present art, as shown in FIG. 2, and can generally be kept at a minimum, i.e. effectively as small as possible.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

FIG. 4a is a diagram of an add/drop filter according to prior art, illustrating the numbering of ports, FIGS. 4b-4d are diagrams of the transmission between different ports of a single channel add/drop filter as a function of the wavelength of light passing between the ports, FIGS. 5a, 5b are diagrams of the transmission between two ports, ports Nos. 2 and 3, in a main band add/drop filter shown as a solid line and in an internal, single channel drop filter in the nodes of FIG. 3 shown as a dashed line, as a function of the wavelength, FIGS. 6a-6c are diagrams of three different kinds of two-channel add/drop filters, FIGS. 6d-6f are diagrams of the transmission between two ports, ports Nos. 2 and 3, two-channel add/drop filters of FIGS. 6a-6c as a function of the wavelength.

DETAILED DESCRIPTION

Figure 1:
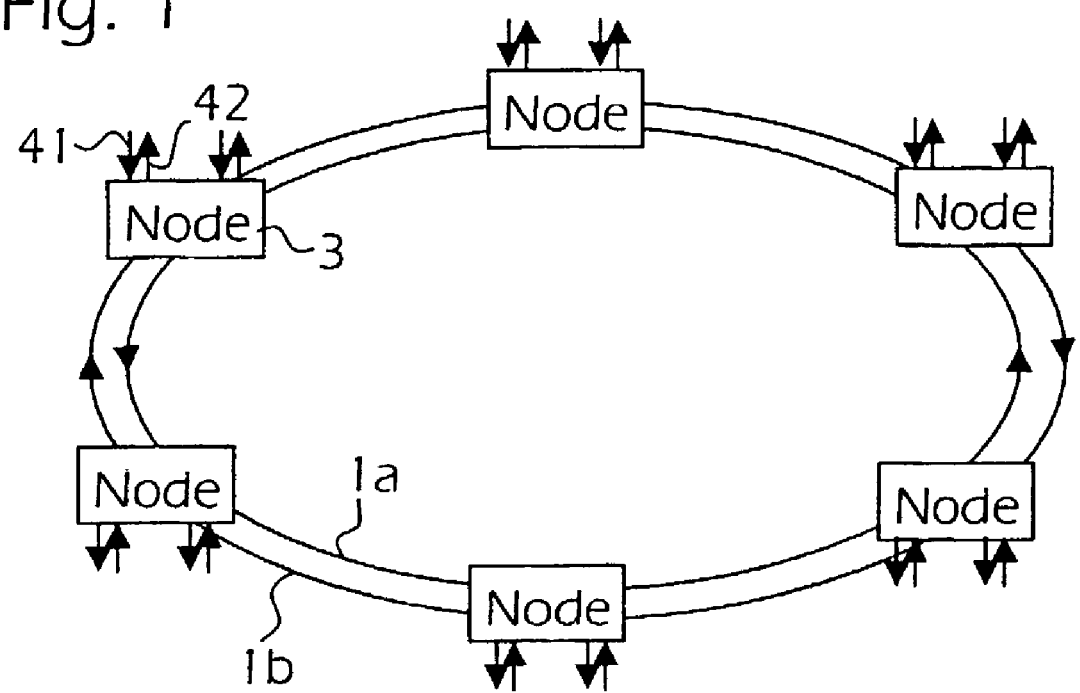
FIG. 1 is a block diagram of a general optical WDM ring network according to prior art and having protection.

The general structure of a typical WDM ring network is shown in the diagram of FIG. 1. Two parallel ring paths 1a, 1b of optical fibers carry light signals propagating in opposite directions. In each fiber ring the light comprising the signals is called the traffic in the path. In each fiber ring the signals are transferred in a plurality of distinct wavelength bands or wavelength channels. In the ring paths a plurality of nodes 3 are connected, the nodes also called add/drop nodes. In each such node signals are taken or dropped from the traffic in at least one of the ring paths 1a, 1b and signals are provided or added to the traffic in at least one of the ring paths. For the illustrated case where two parallel ring paths carry traffic in opposite directions allowing bidirectional communication between the nodes 3, redundancy or protection is obtained. Thus, for transmission from a sending node to a receiving node two paths can be used, a first path being part of a first one of the fiber rings and a second path being part of the second fiber ring, the second path corresponding or being parallel to the part of the first ring which is not used for the first path. Normally only one of the first and second paths 1a, 1b is used, the other one only used for protection and thus only used when the said one of the paths is in failure.

Figure 2:
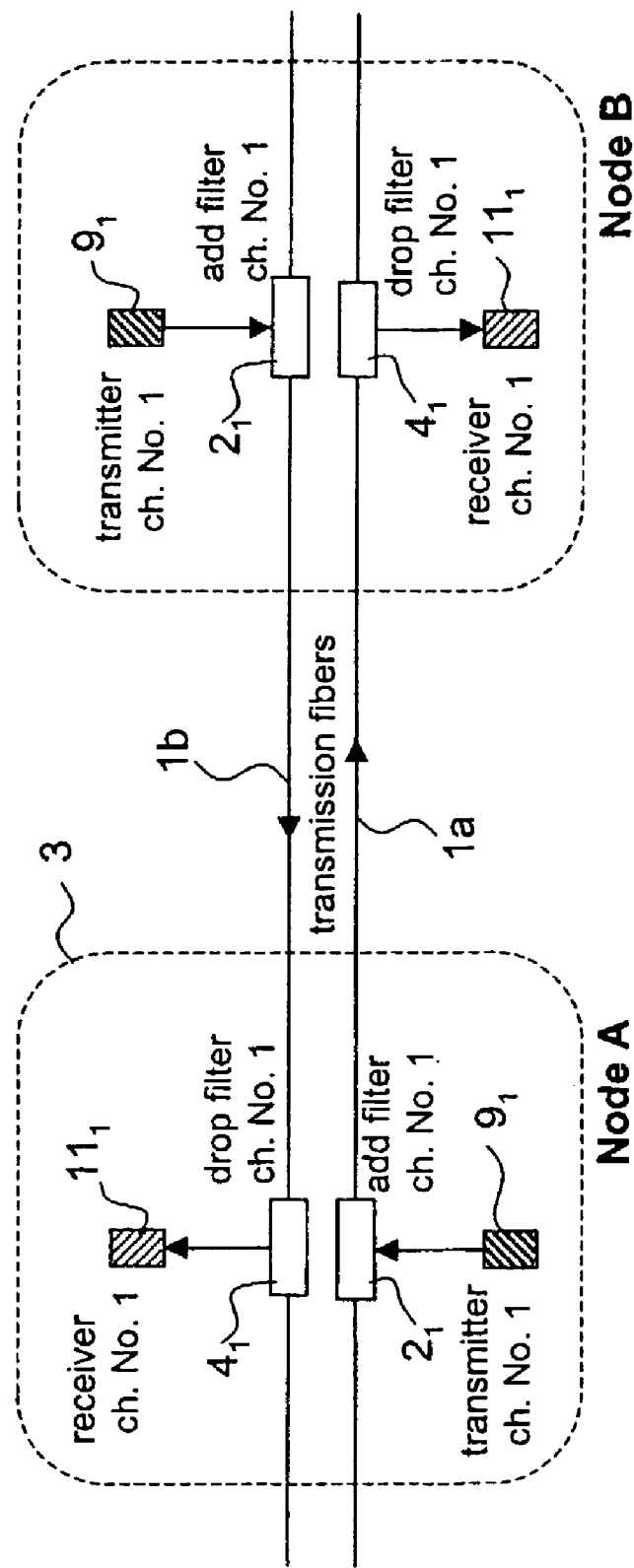
FIG. 2 is a block diagram of a portion of an optical WDM network according to prior art and including a pair of optical add/drop nodes arranged for communication on transmission fibers passing the nodes.

In the schematic diagram of FIG. 2 communication according to prior art between a node A and a node B in e.g. a ring network of the kind shown in FIG. 1 is illustrated. Each of the two fibers 1a, 1b used for transport in the network, here called transmission fibers, carry light signals travelling in only one direction and the directions of the light signals in the two fibers are opposite to each other. Usually the same wavelength channel, as shown wavelength channel No. 1, is used on the two transmission fibers. Totally four add or drop filters $2_1$, $4_1$ connected in the path of the transmission fibers 1a, 1b are needed to achieve the bidirectional communication between the two nodes A, B. The two nodes also include optical transmitters $9_1$ and optical receivers $11_1$ for channel No. 1.

Figure 3:
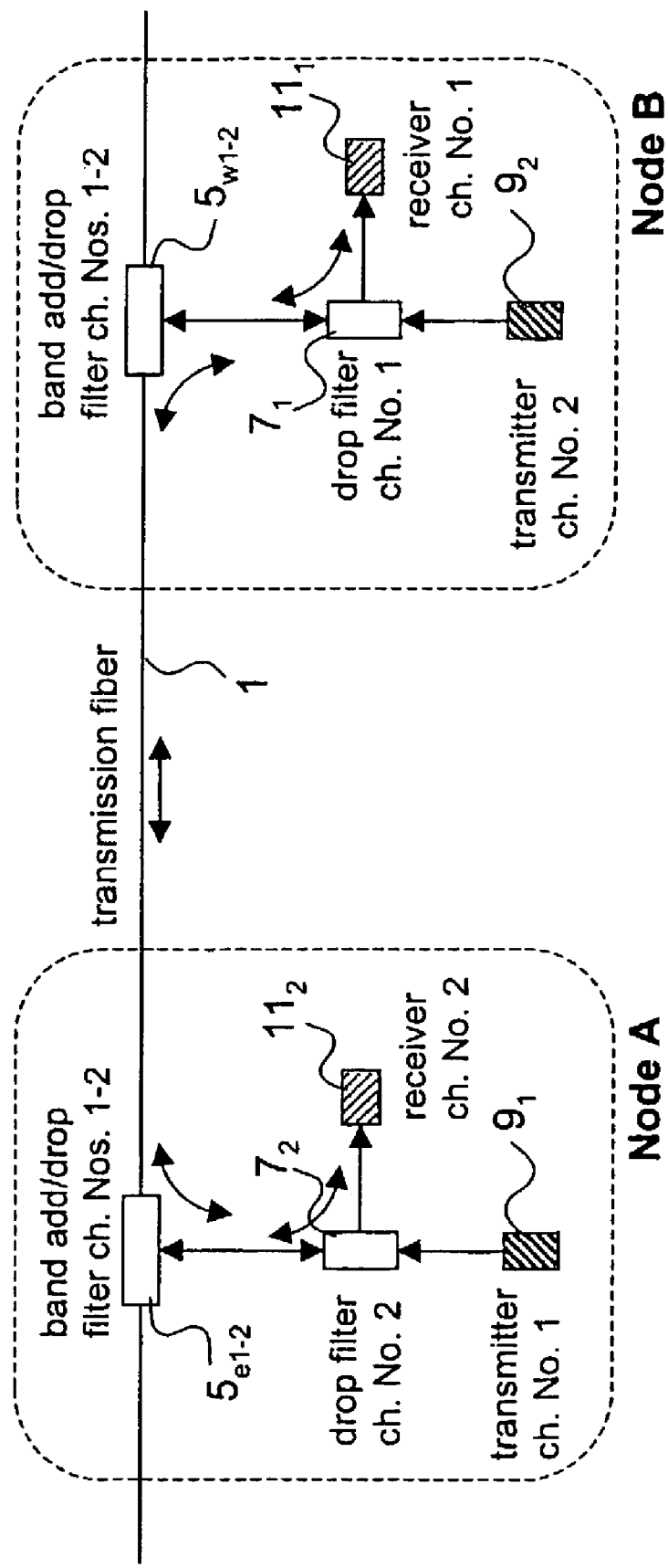
FIG. 3 is a block diagram similar to that of FIG. 2, the nodes arranged for bidirectional or duplex communication on a single transmission fiber.

However, bidirectional communication between a pair of nodes, such as the nodes A and B of FIG. 2, can be achieved using a single transmission fiber 1 as illustrated by the schematic diagram of FIG. 3. The transmission fiber 1 is used for carrying light signals in the two opposite directions. In the transmission fiber 1 in node A a two-channel add/drop filter $5_{e1-2}$, e.g. a band add/drop filter, is connected for dropping light signals in two, preferably adjacent or neighbouring, wavelength channels Nos. 1 and 2 arriving at the node A from the east where it is assumed that the node B is connected directly to the right or eastern side of the node A, the nodes A and B only joined by one unbroken fiber portion. Generally, light of wavelengths different from those used for the bidirectional communication between the nodes A and B, i.e. different from the wavelengths used in channels Nos. 1 and 2 in the example of the figure, passes the add/drop nodes A, B on the transmission fiber with a low loss. To the branch port of the two-channel add/drop filter $5_{e1-2}$ is an internal, single channel drop filter $7_2$ for dropping channel No. 2 connected. It has an express port to which signals outside the dropped channel, i.e. outside the channel No. 2, pass and to this express port is a source of light signals in wavelength channel No. 1 connected, an optical transmitter $9_1$ such as a laser in node A. To the branch port of the single channel drop filter $7_2$ is a light or optical receiver $11_2$ for receiving signals of channel No. 2 connected.

The node B has a structure similar but complementary to that of node A. Thus the two-channel add/drop filter $5_{w1-2}$ is adapted for only branching traffic from the west, the internal single channel drop filter $7_1$ drops signals of wavelength channel No. 1, the light signal source $9_2$ transmits light only in wavelength channel No. 2 and the receiver $11_1$ is adapted to receive signals in wavelength channel No. 1. The light signal source $9_1$ in node A generates signals only in wavelength channel No. 1 which are input to the express port of the single channel drop filter $7_2$ in node A. The signals of channel No. 1 thus pass the drop filter $7_2$ with a low loss and are then coupled into the two-channel add/drop filter $5_{e1-2}$ connected in the transmission fiber 1. Due to the branching direction of the two-channel add/drop filter the signals of channel No. 1 are added to the traffic in the transmission fiber 1 travelling in the eastern direction as seen from node A and hence propagate in the right direction as seen in FIG. 3 until they come to the node B. In the node B the signals of channel No. 1 are dropped in the two-channel add/drop filter $5_{w1-2}$ in node B and are therefrom coupled to the internal, single channel drop filter $7_1$ in node B. All the light of wavelength channel No. 1 is dropped in the internal, single channel drop filter and is communicated to the receiver $11_1$ in the node B.

As to signals in the opposite direction, in the node B the light signal source $9_2$ transmits light signals only in wavelength channel No. 2. The signals pass in the reverse direction through the internal, single channel drop filter $7_1$ with a low loss, are coupled into the branching port or add/drop port of the two-channel add/drop filter $5_{w1-2}$ and propagate in the western or left direction in the transmission fiber 1 together with other traffic in same direction. In the node A the considered channel No. 2 signals are dropped in the two-channel add/drop filter $5_{e1-2}$, are coupled into the single channel drop filter $7_2$ and are dropped in that filter and further coupled into the receiver $11_2$ of the node A.

If the two-channel add/drop filters $5_{e1-2}$ and $5_{w1-2}$ are of band add/drop type, the wavelength channels used for bidirectional communication between a pair of nodes, i.e. channel Nos. 1 and 2 in the example described above should, as has been indicated above, should preferably be neighbours or adjacent, so that thereby these filters $5_{e1-2}$, $5_{w1-2}$ block as few other wavelength channels as possible and preferably none.

Add/drop filters for wavelengths different from or outside the add/drop wavelengths of the two-channel add/drop filters $5_{e1-2}$, $5_{w1-2}$ in the node A and B can be connected in the transmission fiber 1 without limiting the function of the bidirectional communication described above.

The two-channel add/drop filters $5_{e1-2}$, $5_{w1-2}$ and the single channel drop filters $7_1$, $7_2$ internal of the nodes all have three fiber ports. They can for example be of type thin film interference filters from for example the company E-TEK, product type DWFI, or from Corning, or Oplink. The function of a single channel add/drop filter is illustrated by FIGS. 4a-4d. The single channel drop filter has three ports numbered 1-3 where port No. 2 is the normal or typical input/output port, port No. 1 the express port and port No. 3 is the branch or branched port or add/drop port. From port No. 1 to port No. 2 and in the opposite direction, i.e. from port No. 2 to port No. 1, signals of all wavelength channels, except those of the dropped channel, pass with a low loss, see the diagram in FIG. 4b of the transmission as a function of the wavelength. From port No. 2 to port No. 3 and in the opposite direction, i.e. from port No. 3 to port No. 2, only signals of the dropped channel pass with a low loss, see the diagram of FIG. 4c. From port No. 1 to port No. 3 and in the opposite direction, i.e from port No. 3 to port No. 1, the signals of all wavelength channels experience a high loss, see FIG. 4d.

The ports of multi-channel and band add/drop filters can be numbered in a way corresponding to that illustrated in FIG. 4a. A multi-channel add/drop filter generally branches only the wavelengths of at least two channels, all other channels passing through the filter, between ports Nos. 1 and 2 thereof, with a low loss. Band add/drop filters, in the meaning used herein, have the same basic function as the single channel drop filters, but have a wider wavelength range dropped so that several channels are dropped, i.e. are branched between ports Nos. 2 and 3 and blocked between ports Nos. 1 and 2.

The wavelength dependence of the multi-channel add/drop filters $5_{e1-2}$, $5_{w1-2}$ for the case where they are band add/drop filters and of the single channel drop filters $7_2$, $7_1$ in the nodes A and B, as used in the nodes according to the schematic of FIG. 3, is shown by the diagrams of FIGS. 5a and 5b respectively in which the graphs show transmission between ports Nos. 2 and 3 of the filters. The solid lines illustrate the transmission in the band add/drop filter of the respective node and the dashed line the transmission of the single channel drop filter.

In FIGS. 6a-6c examples of different types of two-channel add/drop filters are shown, the spectral responses, i.e. the transmission between ports Nos. 2 and 3 as a function of the wavelength, being shown by the diagrams of FIGS. 6d-6f respectively. The two-channel band add/drop filter illustrated in FIG. 6a is the type thin-film interference filter. The filter add/drops two neighbouring channels as seen in FIG. 6d.

In the two-channel add/drop filter illustrated in FIG. 6b, the central element is an optical circulator 17. At the express port of the filter two fiber Bragg gratings $19_{N1}$, $19_{N2}$ are connected, each grating reflecting wavelengths of a specific wavelength channels Nos. N1, N2. In FIG. 6c an add/drop filter is illustrated having a sampled fiber Bragg grating 19S connected at the express port and an optical circulator 17 as in the filter of FIG. 6b. The grating 19S reflects the wavelengths of every third channel, these channels being dropped in the filter as can be seen in the diagram of FIG. 6f.

Figure 7A:
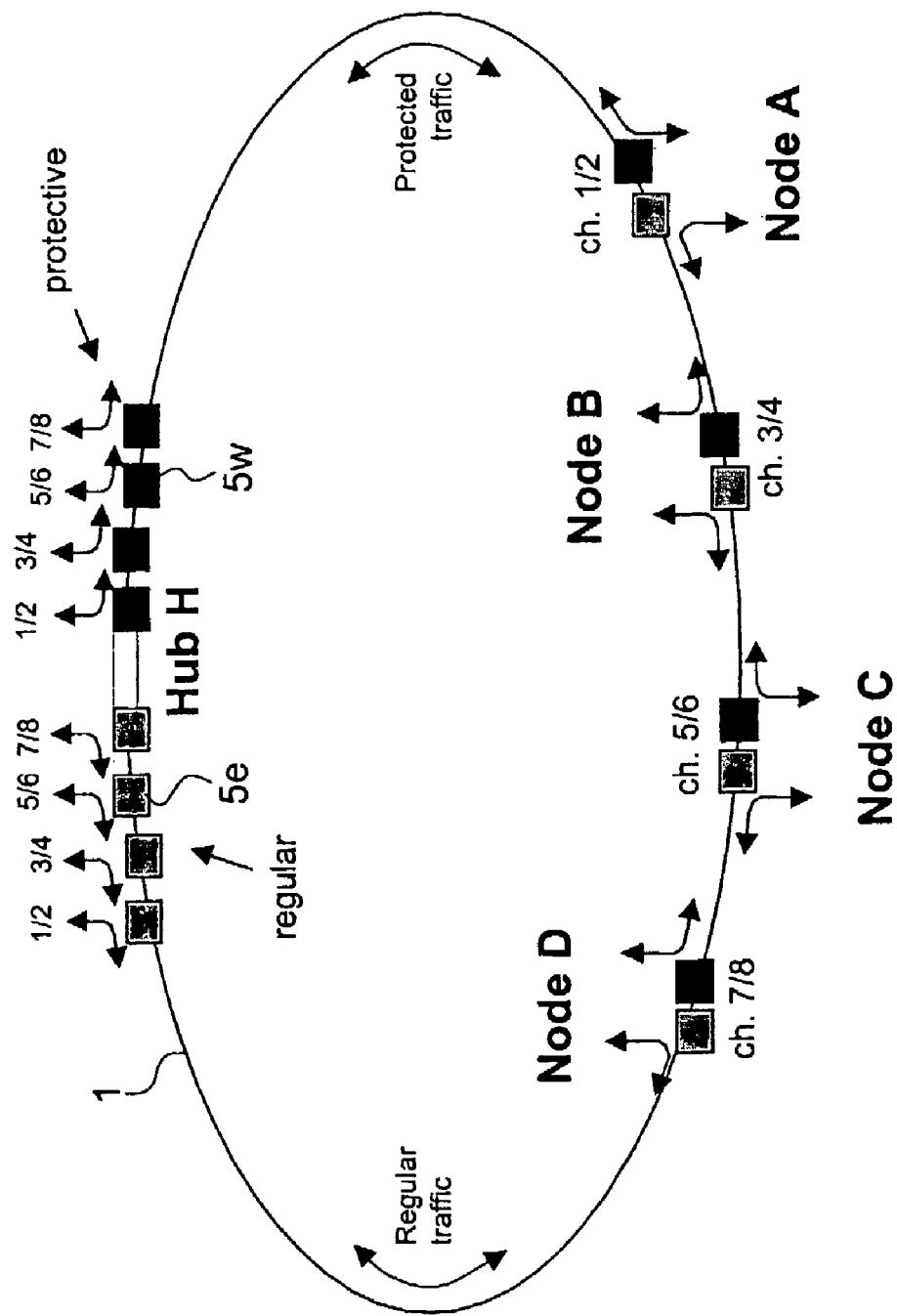
FIG. 7a is a diagram of a ring-type optical WDM network having a hub or main node and using a single fiber as transmission fiber or main fiber path allowing bidirectional communication between the hub or main node and other nodes connected in the transmission path, the network having protection.

An example of a WDM ring network built using the node structure shown in FIG. 3 is illustrated by the block diagram of FIG. 7a in which only the two-channel add/drop filters of the nodes, i.e. the filters which are directly connected in the ring fiber path, are shown. Only one transmission ring fiber 1 is used. The network has a central or main node, the hub node H, which has a direct optical connection with each of the satellite nodes, which are four in this example and are referenced by the letters A to D. In the left half of the hub node H four two-channel add/drop filters $5_e$ are required, one for communication with each satellite node A-D and all adapted for communication for example in the same direction, the counter-clockwise or western direction in the figure, as seen from the hub node. Eight wavelength channels are required, in the figure channels Nos. 1-8.

Obviously, no ring structure is required for this communication between the hub node and each of the satellite nodes but the complete fiber ring is used for providing redundancy or protection in the network. Thus, for protection purposes the hub node H is illustrated to have additional four band add/drop filters $5_w$, the regular band add/drop filters shown as grey squares and those used for protection shown as black squares. The protection band add/drop filters are preferably also all connected for communication in one direction, in the direction opposite to that chosen for the regular filters, for the hub node H in the eastern or clockwise direction as seen in the figure. For example, the regular communication from the hub node H to the node B is carried on wavelength channel No. 3, and the response from node B to the hub is carried on wavelength channel No. 4. This means that the two-channel add/drop filters in both the hub node H and in the node B are adapted to drop channels Nos. 3 and 4 for this communication, the internal single channel drop filter, not shown in FIG. 7a, in the hub node H is adapted to drop channel No. 4, and the internal single channel drop filter, not shown, in the node B is adapted to drop channel No. 3.

In a fiber ring network there are two possible paths between the hub node H and each satellite node A-D, these two paths using different, complementary sections of the ring, a right section and a left section as seen in FIG. 7a obtained by dividing the ring at the hub node and the considered satellite node. In the example of FIG. 7a, for normal traffic, in the case where every component of the network is operating, the traffic from the hub node H to the satellite nodes A-D goes in the anti-clockwise direction along the ring fiber and the traffic from the satellite nodes to the hub node goes in the opposite or clockwise direction, this determining the connection direction of the two-channel add/drop filters used for the regular communication.

If a fiber break occurs e.g. between the nodes A and B as connected in FIG. 7a, the traffic between the hub node H and the satellite nodes B, C and D is unaffected, passing in the left section of the ring, whereas the traffic between the hub node H and the satellite node A can be redirected to the other, right section of the ring. This is done by utilizing the protection two-channel add/drop filters used for the protection bidirectional communication between the hub node H and the satellite node A. These protection two-channel add/drop filters use the same or corresponding wavelength channels as the regular ones but transmit/receive traffic in the opposite direction, as has also been mentioned above.

Alternatively, if protection is not needed in a ring network as illustrated in FIG. 7a, the communication paths between the satellite nodes A, B, C and D and the hub node H going in the right section of the ring can be used for other traffic channels, thus increasing the total capacity of the ring.

It is advantageous to transmit signals in the same wavelength channel from a node both for normal and protection traffic. The reason is that some of the light that should be totally dropped in a band add/drop filter always leaks through along the ring fiber and is mixed with the signal added in the same node, this being an unwanted effect. This unwanted residual light travels along with the desired signal and finally reaches the receiver in the same node from which it was originally transmitted. If then the desired wavelength channel and the unwanted channel leaking through have different wavelengths the unwanted light is filtered once more in the single channel drop filter and thereby the cross talk effect is strongly reduced.

Figure 7B:
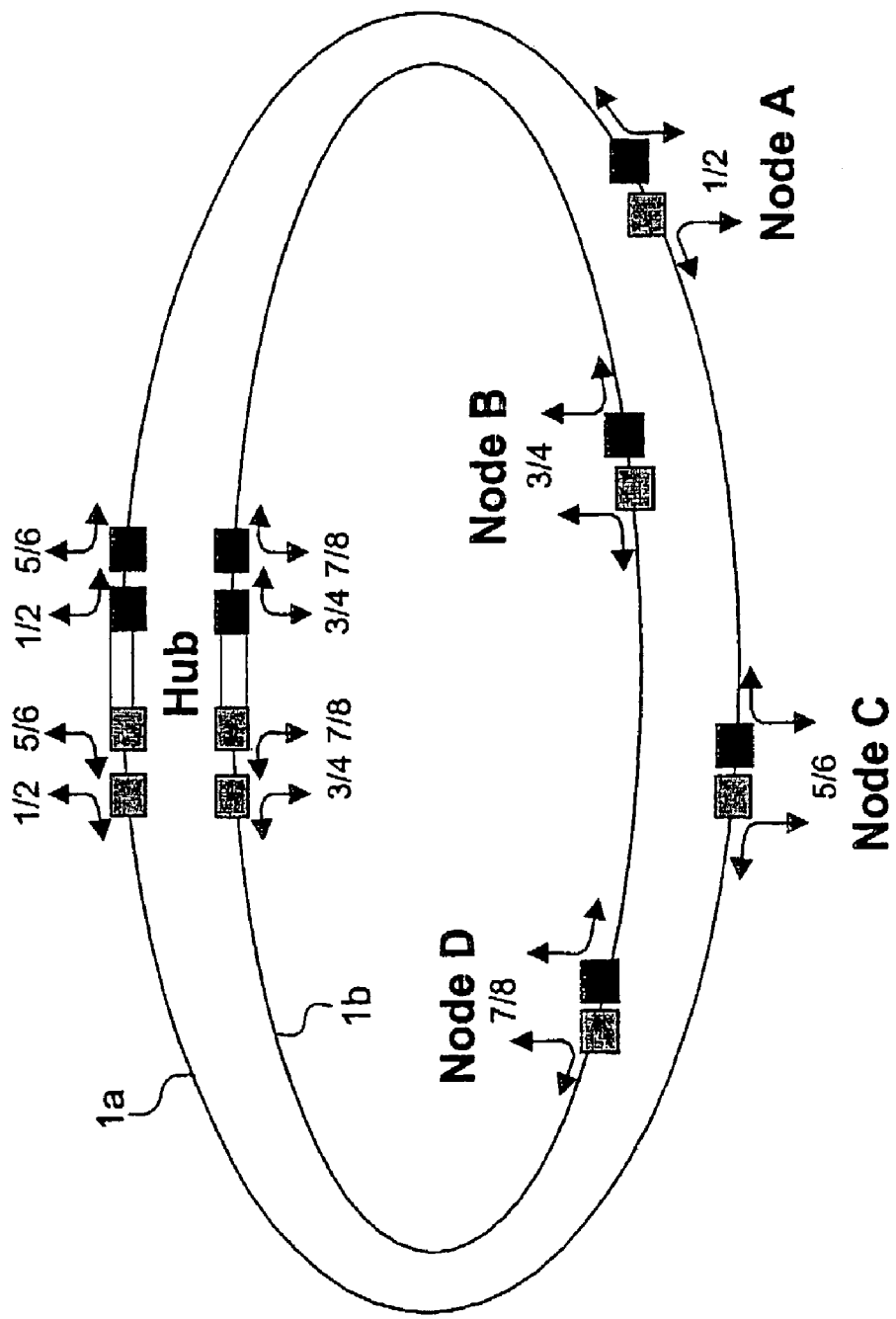
FIG. 7b is a diagram similar to that of FIG. 7a but using two parallel fiber paths.

If two or more ring transmission fibers or parallel fiber paths are used instead of only one ring transmission fiber the number of two-channel add/drop filters connected in each ring fiber can be reduced, see the network illustrated in FIG. 7b in which two parallel ring transmission fibers 1a, 1b are provided. This results in that the optical losses on each ring fiber can be significantly reduced, and thus the size of the ring can be increased without using optical amplifiers, or alternatively, more traffic channels can be carried in the network without increasing the optical losses. It shall also be observed that the wavelengths in the two rings are independent. For example, the pairs of channels Nos. 1/2 and of Nos. 3/4 in FIG. 7b can be of the same two wavelengths since they travel on different fibers. This can be advantageous in order to keep the number of different component variants low, or for better utilizing the wavelength range that is most efficiently amplified by erbium doped fiber amplifiers. Generally, the links used for the bidirectional communication between the nodes, i.e. whether the bidirectional communication is carried on the first or second ring fiber, should be selected so that the highest loss of traffic in the two rings becomes as low as possible, in the general case in the two or more parallel transmission fiber rings becomes as low as possible. This may in practice e.g. result in that there are equal numbers of add/drop filters connected in the two or more fiber rings. However, it is also possible to have more add/drop filters connected in one first parallel fiber path, these filters used for traffic having short transmission distances and hence low loss, and to have fewer add/drop filters connected in the other, second parallel fiber path, these latter filters used for traffic over longer transmission distances and thereby a higher loss.

Figure 8A:
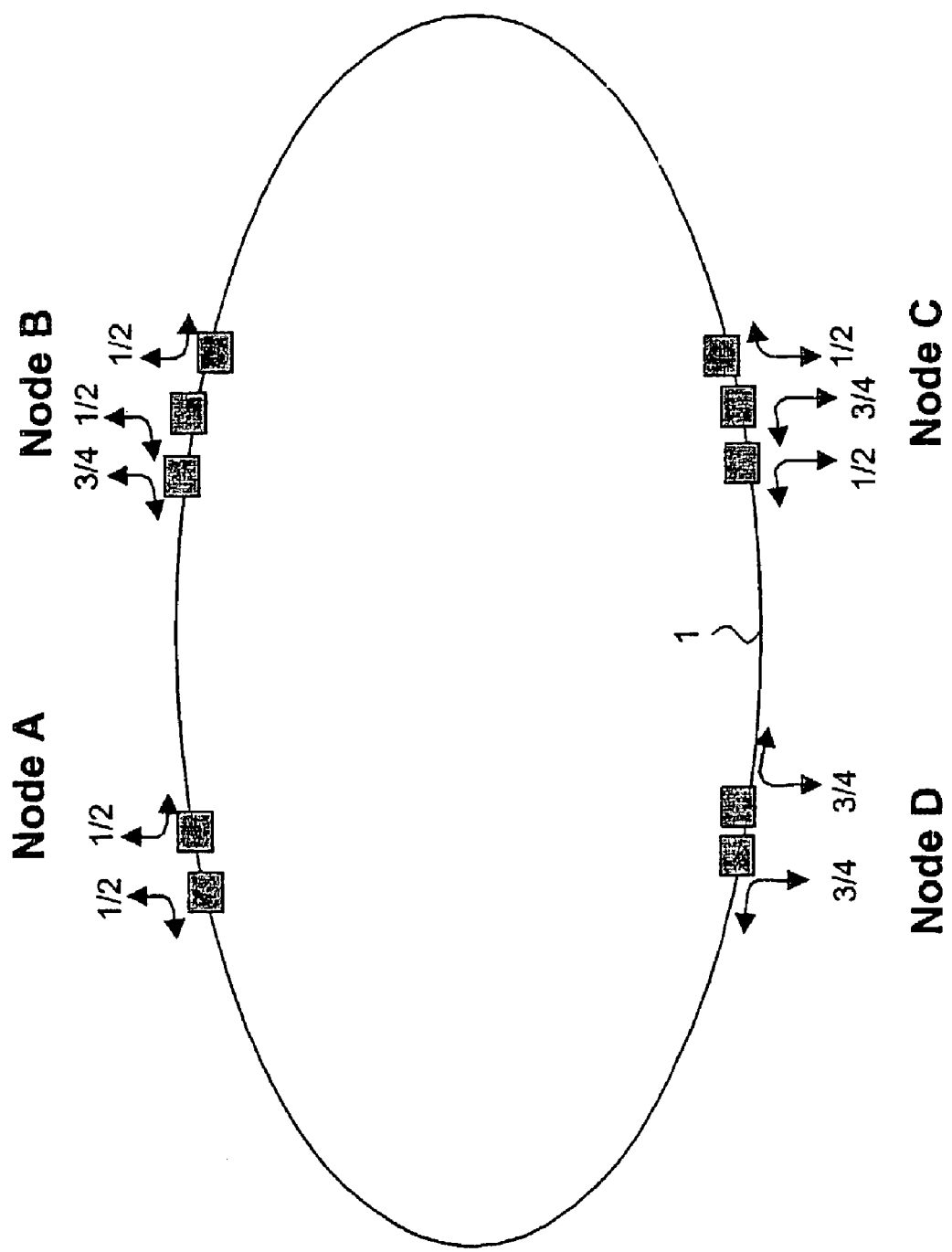
FIG. 8a is a diagram of a ring-type optical WDM network having a meshed traffic pattern and using one transmission fiber or main fiber path.
Figure 8B:
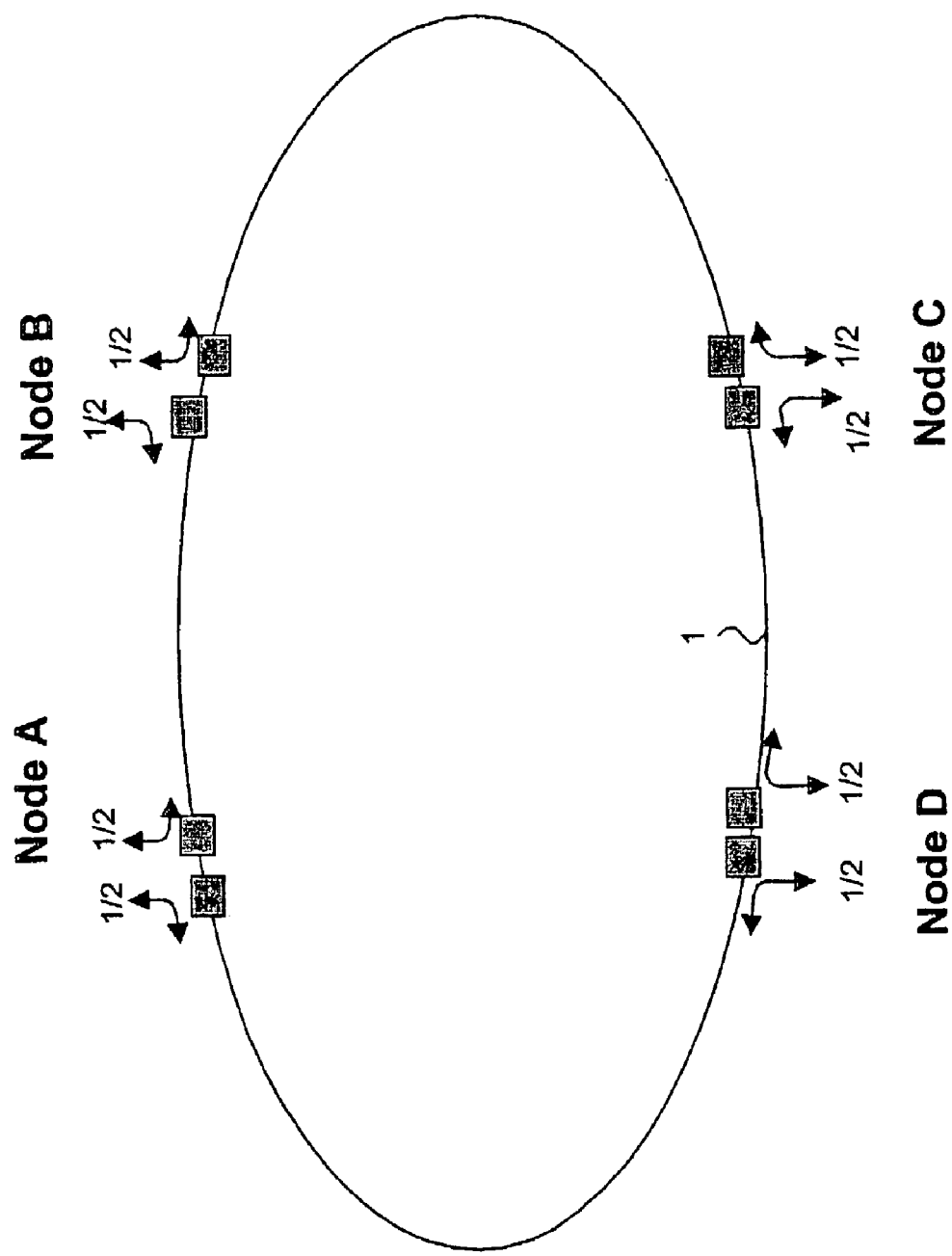
FIG. 8b is a diagram of a ring-type optical WDM network having only traffic between adjacent nodes and using one transmission fiber or main fiber path.

The bidirectional communication described with reference to FIG. 3 can also be used in WDM networks having a meshed traffic pattern as exemplified by the diagram in FIG. 8a. Here a single ring transmission fiber 1 carries all traffic in both directions and no protection is used. If only traffic between neighbouring nodes is allowed in a network, such traffic called strictly adjacent traffic, only two channels are required for the bidirectional communication as is illustrated in the diagram of FIG. 8b.

Figure 8C:
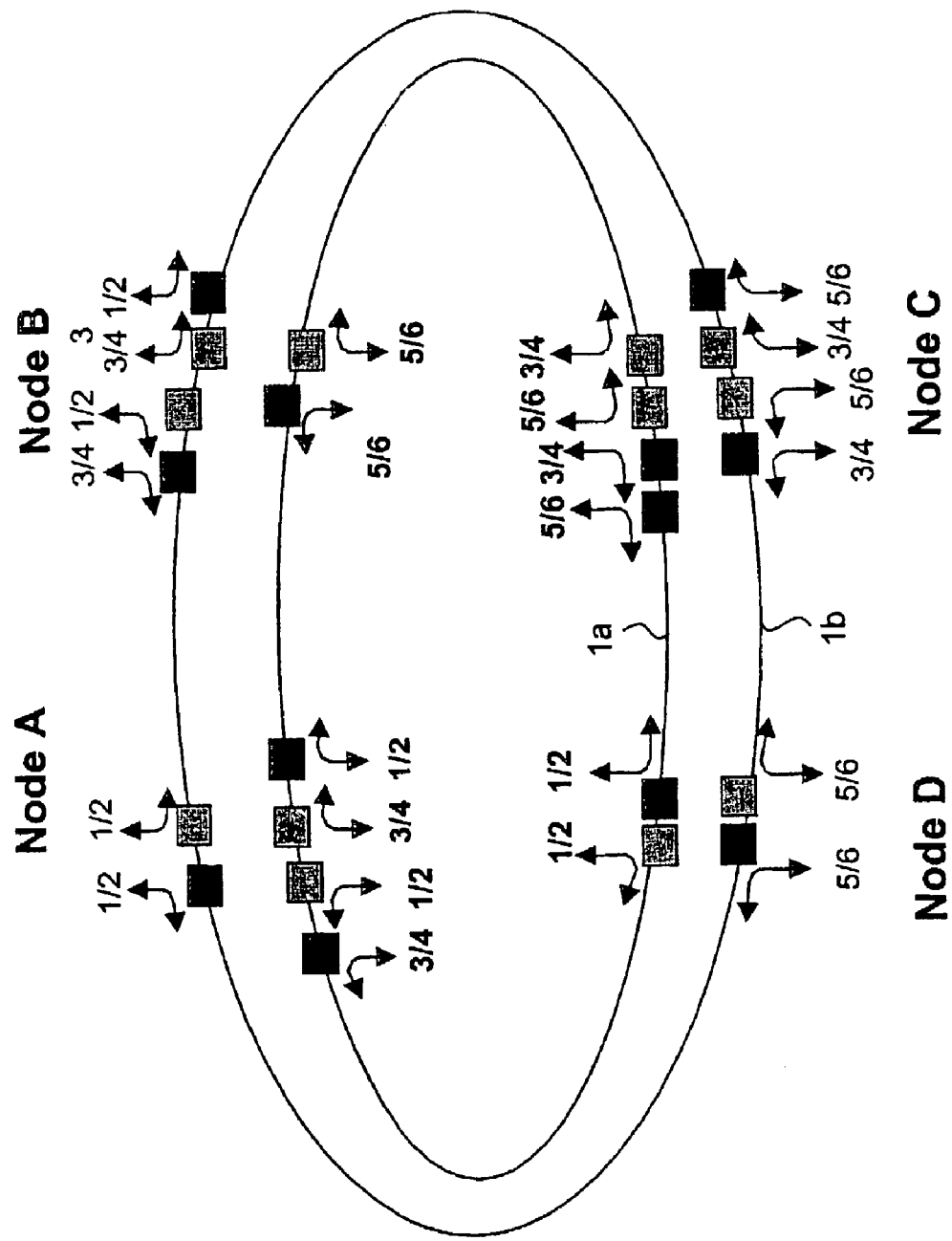
FIG. 8c is a diagram of a ring-type optical WDM network having a meshed traffic pattern and using two parallel transmission fibers or main fiber paths allowing bidirectional communication between nodes connected in the transmission path, the network having protection.

A WDM ring network having a meshed traffic pattern and using bidirectional communication described with reference to FIG. 3 and also having protection is exemplified by the principle diagram in FIG. 8c. Here two ring transmission fibers 1a, 1b, each carrying traffic in both directions, are used in order to have less loss resulting from the two-channel add/drop filter losses on each fiber. The grey squares denote add/drop filters used for normal or regular traffic. The black squares denote add/drop filters used for protection traffic. It can be observed that wavelength channel numbers of channels used in the inner fiber 1a written in a bold typeface in FIG. 8c and the wavelength channel numbers used in the outer fiber 1b written in a normal typeface can denote channels which have the same channel wavelength. In the same way as for the network of FIG. 7b the ring fibers used for the bidirectional communication between each of the nodes should be selected so that the highest loss of traffic in the two rings becomes as low as possible.

Figure 9A:
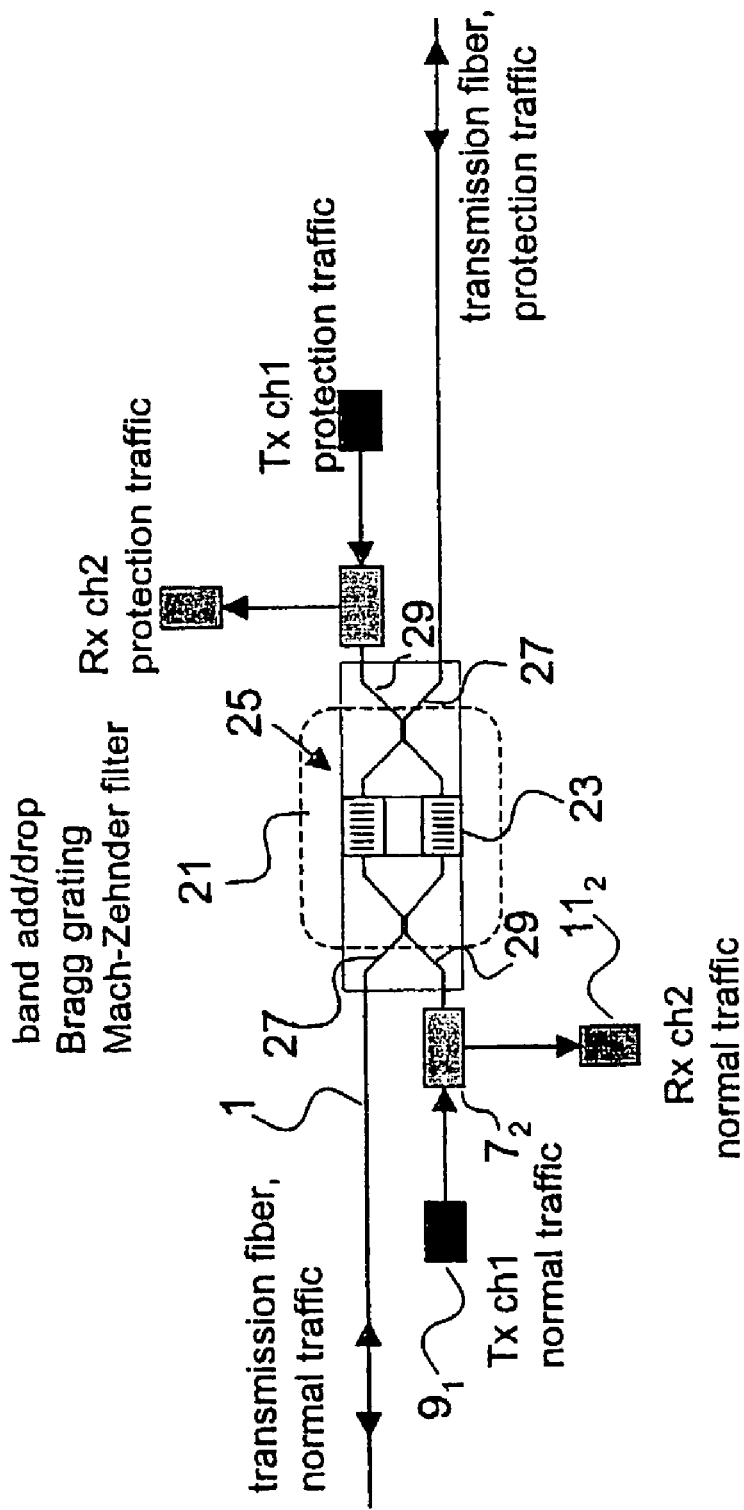
FIG. 9a is a diagram of a portion of an add/drop node including a Bragg grating Mach-Zehnder filter.

The two add/drop filters in a node used for normal and protection traffic in the networks illustrated in FIGS. 7a-8c, i.e. for bidirectional communication in the main fiber in the western and eastern directions as seen from the node, can be replaced by a single device. Thus in the block diagram of FIG. 9a, a node is shown including, instead of two two-channel add/drop filters, a 4-port add/drop filter 21 having reflective Bragg gratings 23 in the two parallel paths of a Mach-Zehnder interferometer 25. This kind of add/drop filter is sold by e.g. the company Arroyo Optics under the product name Fiber-Filter AD 200.

This type of Bragg grating Mach-Zehnder filter 21 has four ports or terminals, two ports 27, called express ports, used for connecting the combined filter in the main fiber path and two ports 29, called add/drop ports, for connecting to the internal drop filters, $7_1$, $7_2$, see also FIG. 3, of the node. As can be seen from FIG. 9a the signals added/dropped on the left add/drop port are reflected to/from the portion of the transmission fiber connected to the left side of the node and the signals added/dropped on the right add/drop port are reflected to/from the portion of the transmission fiber connected to the right side of the node. All other wavelength channels except the two channels which are added/dropped pass the combined filter from one portion of the transmission fiber or main fiber path to the other portion with a low loss.

Figure 9B:
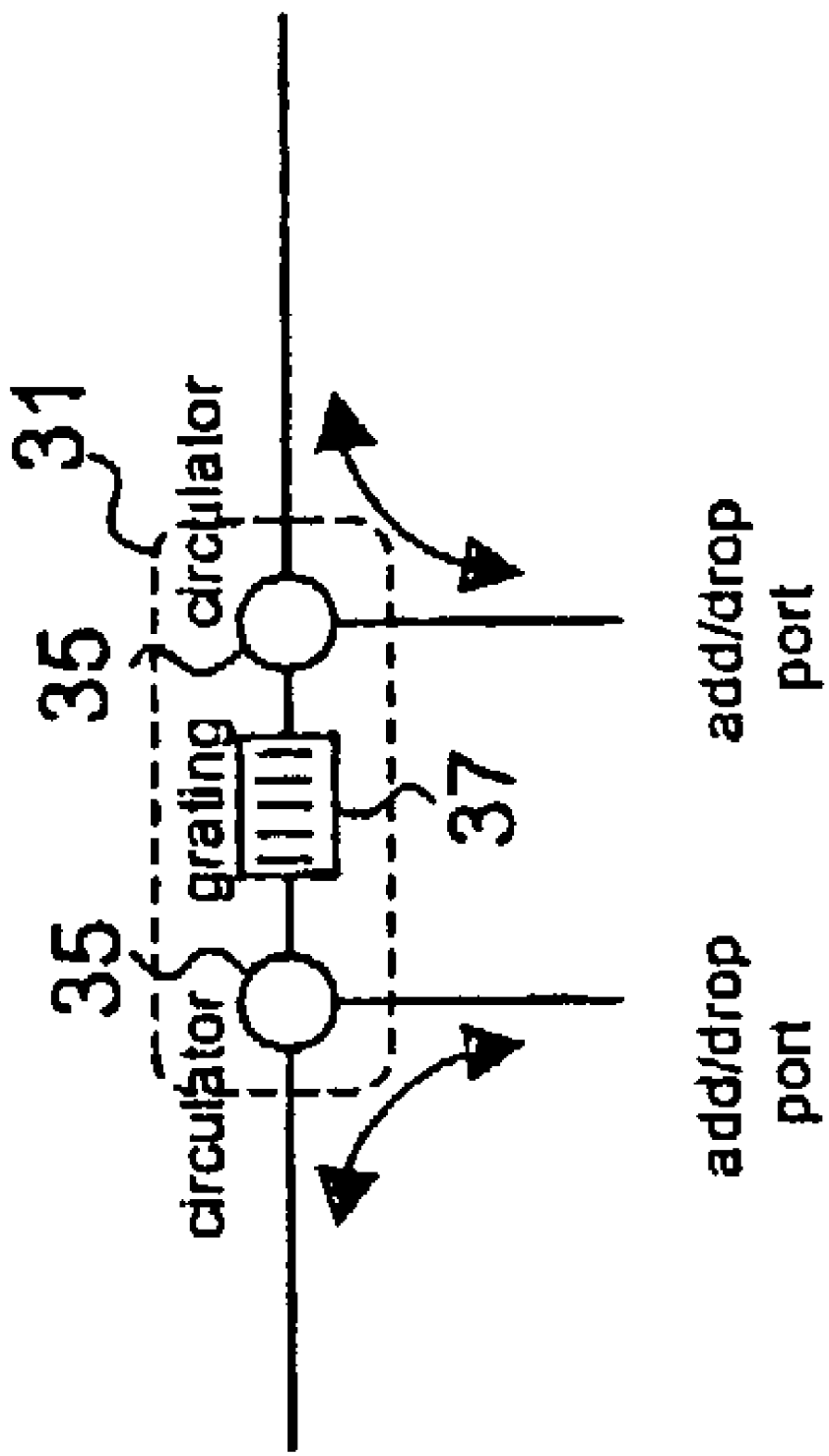
FIG. 9b is a diagram of a combined filter including a Bragg grating connected between two optical circulators to be used in an add/drop node.

Another single device that can replace the two add/drop filters in a node used for normal and protection traffic or generally traffic in the opposite directions from the node is illustrated by the diagram of FIG. 9b. In the device 31 a fiber Bragg grating 33 is connected between two optical circulators 35. The device has a function substantially identical to that of the Bragg grating Mach-Zehnder filter shown in FIG. 9a.

The node design for bidirectional communication described with reference to FIG. 3 can be modified to allow bidirectional communication on several channels, see FIG. 10. Several channels, e.g. channels Nos. 1-4 in node A and channel Nos. 5-8 in node B, are added onto the traffic in the transmission fiber 1 using one multi-channel add/drop filter, $5_{e1-8}$ or $5_{w1-9}$, and several channels, e.g. channels Nos. 5-8 in node A and channels 1-4 in node B, are dropped from the traffic in the transmission fiber using the same multi-channel add/drop filter. The channels of the multi-channel add/drop filter $5_{e1-8}$, or $5_{w1-8}$ which can be a band add/drop filter includes the wavelengths of all the used channels, e.g. channels Nos. 1-8 in the example shown in the figure. The wavelengths of the added channels can be separated from those of the dropped channels by e.g. having one group being long wavelengths and the other being short wavelengths. The internal single channel drop filter $7_2$ in node A in FIG. 3 is then replaced by generally a multi-channel drop filter, such as a wavelength band split filter or a band drop filter $7_{5-8}$ having a suitable bandwidth, in the example the dropped channels including the channels Nos. 5-8. The single channel drop filter $7_1$ in node B in FIG. 3 is similarly replaced by a multi-channel drop filter $7_{1-4}$ such as a band drop filter having a band including the wavelengths of channels Nos. 1-4.

As an alternative, the wavelengths of the channels added in a node (A or B in the figure) can be separated from those of the dropped channels by having one group being odd numbered channels and the other group being even numbered channels, the numbering of the channels being made sequentially for e.g. increasing wavelengths. Then instead of the internal band split or drop filters $7_{5-8}$ and $7_{1-4}$ optical interleaver filters are used letting every second channel through and branching every other channel, for instance branching or deflecting channels Nos. 2, 4, 6, 8 in node A and branching channel Nos. 1, 3, 5, 7 in node B.

Connected to the internal multi-channel drop filter, i.e. the band split filter $7_{5-8}$ or $7_{1-4}$, alternatively the optical interleaver filter, is an optical multiplexer $13_{1-4}$ or $13_{5-8}$ for receiving and combining the add channels and an optical demultiplexer $15_{5-8}$ or $15_{1-4}$ for filtering out the individual drop channels. The optical multiplexers are thus connected to receive light from light sources such as transmitters $9_1$, $9_2$, . . . for the respective channels and combine the light issued thereby to a single combined signal. The optical demultiplexers are connected to transmit the demultiplexed light signals to light receivers $11_1$, $11_2$, . . . for the respective channels.

Figure 10:
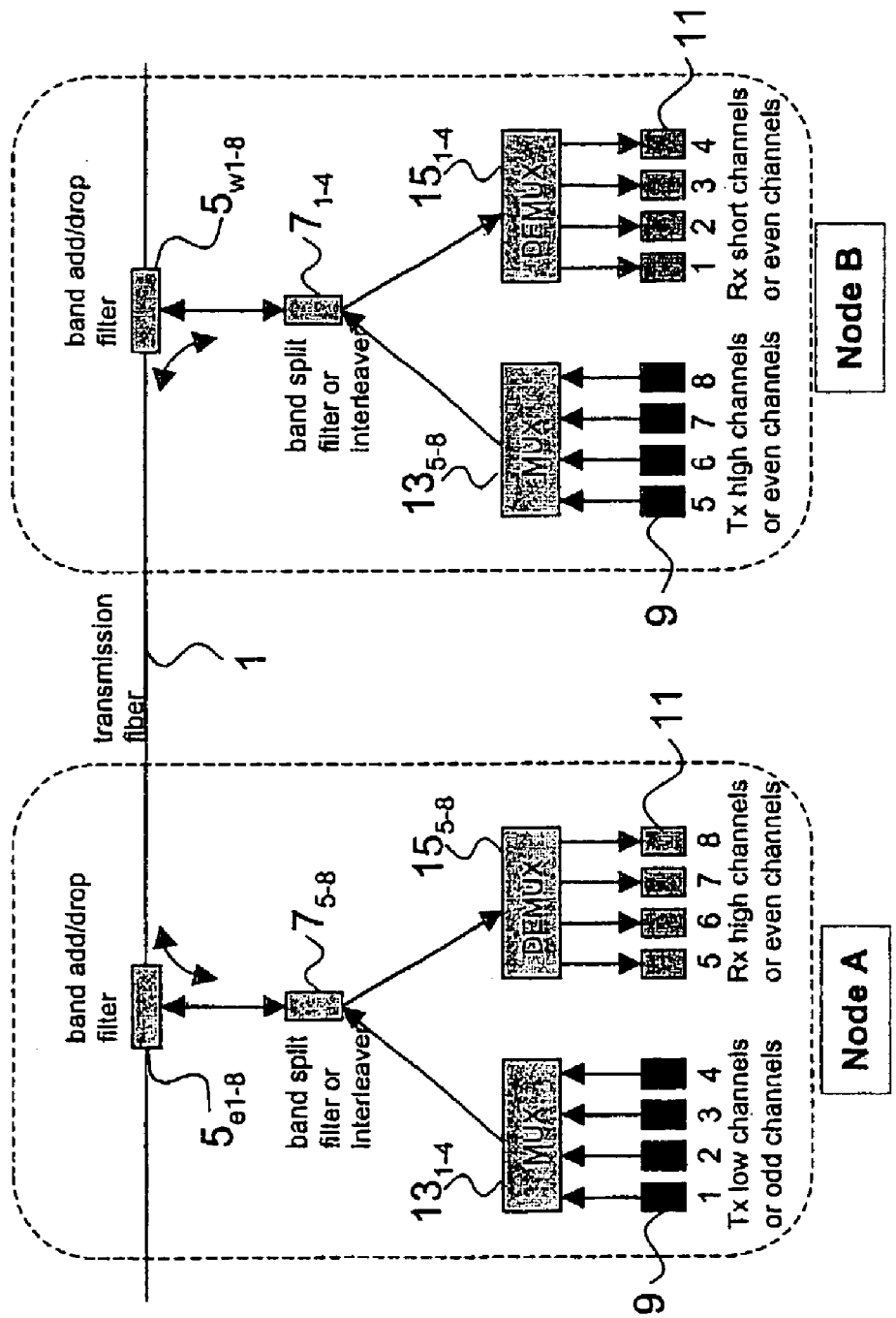
FIG. 10 is a block diagram of a portion of an optical WDM network similar to that of FIG. 3, the nodes arranged for bidirectional or duplex communication on a single transmission fiber in several channels.

A first advantage of the node structure as illustrated in FIG. 10 is that fewer band add/drop filters are needed on the transmission fiber 1 for nodes having communication in many channels. This means a lower optical loss for the traffic on the transmission fiber and thus a longer reach for signals propagating in the transmission fiber.

A second advantage is that an optical interleaver filter can be used instead of a band split filter as the intermediate or internal filter in the nodes. This allows a wider channel separation in the multiplexers and demultiplexers used, and thus simpler and lower cost devices.

Figure 11:
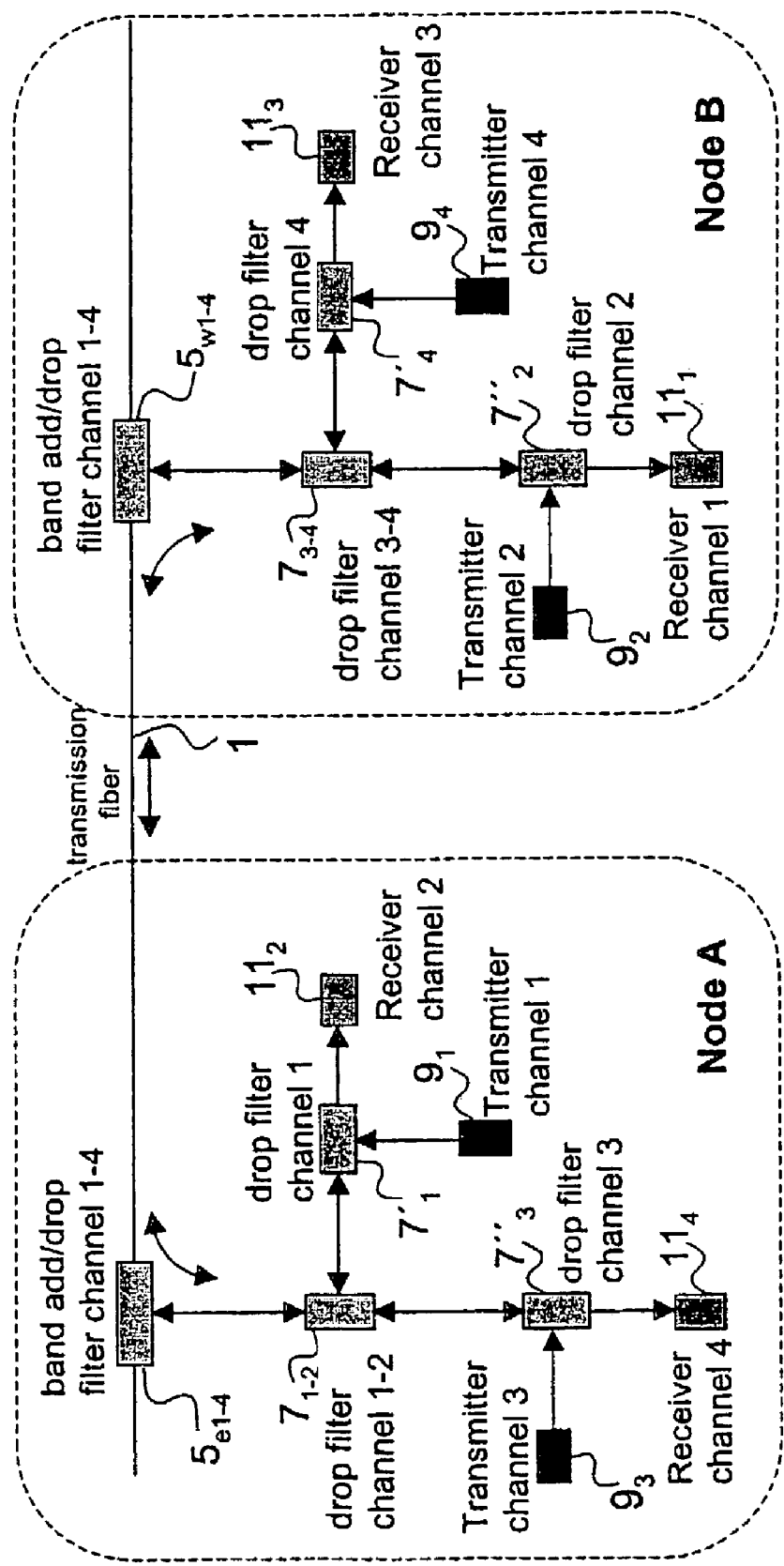
FIG. 11 is a block diagram of a portion of an optical WDM network similar to that of FIG. 10 including nodes of an alternative structure.

Another way of modifying the node structure described with reference to FIG. 3 to allow bidirectional communication on more than one channel is shown by the diagram in FIG. 11. This structure can be seen as an extension or generalization of the node structure illustrated in FIG. 3. In the node structures shown in FIG. 11 two bidirectional channels are added/dropped in the multichannel add/drop filters $5_{e1-4}$ and $5_{w1-4}$ on the transmission fibers 1, these add/drop filters thus branching all of the wavelengths used, as in the other node structures described above. Instead of the single channel drop filters inside the nodes two-channel filters $7_{1-2}$ and $7_{3-4}$, e.g. band drop filters, are used for dropping two channels such as channel Nos. 1 and 2 and channel Nos. 3 and 4 for node A and node B respectively in the example of the figure. The two-channel drop filters are each connected to structures similar to the inner structure of the nodes as illustrated in FIG. 3, i.e. to structures having a single channel drop filter $7'_1$, $7''_3$ connected to a light signal source $9_1$, $9_3$ and to a light receiver $11_2$, $11_4$ in node A in the example illustrated in the figure. The structure of the nodes illustrated in FIG. 11 can easily be extended to cover more than two duplex channels.

The benefit of the node structure illustrated in FIG. 1, as for the node structures described with reference to FIG. 10, is that a node for which the communication requires several WDM channels will introduce a minimum express loss on the transmission fiber.

Still another way of modifying the node structure described with reference to FIG. 3 to allow bidirectional communication on more than one channel is shown by the diagram in FIG. 12. As in the structure of FIG. 1, two bidirectional links are added/dropped in the multi-channel add/drop filters $5_{e1-4}$ and $5_{w1-4}$ connected in the transmission fibers 1. Single channel drop filters $7_1$ and $7_3$ are connected inside the nodes to the add/drop ports of the respective multi-channel add/drop filters. The drop ports of the single channel drop filters are connected to receivers $11_1$, $11_3$ for the dropped channel. The express ports of these drop filters are connected to second single channel drop filters $7'_2$, $7'_4$ which have their add/drop ports connected to receivers $11_2$, $11_4$ for the channels dropped in these filters. The express ports of the second drop filters are connected to add filters 35 or combiners receiving light signals from light transmitters $9_3$, $9_4$ in node A and $9_1$, $9_2$ in node B.

Figure 12:
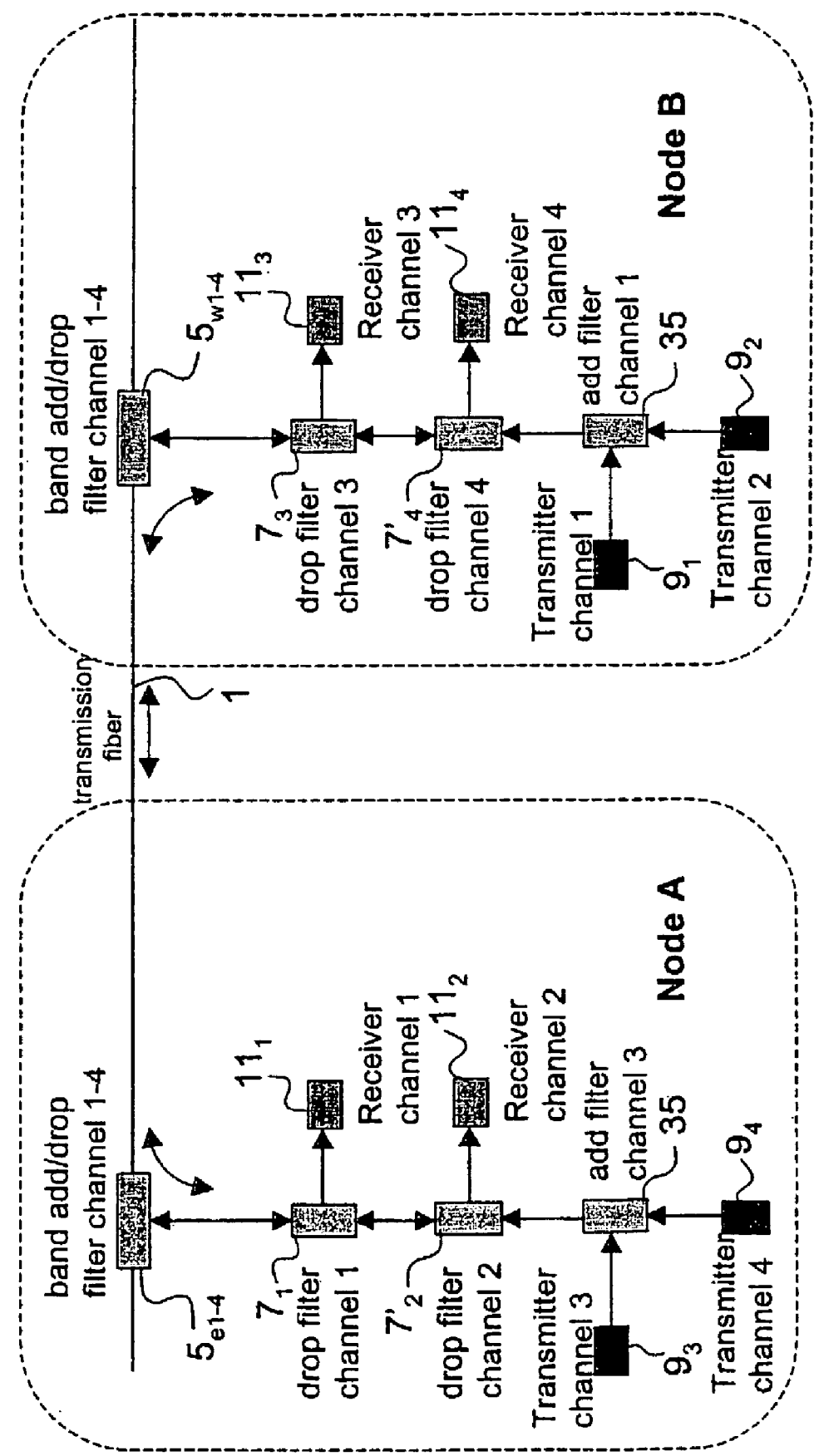
FIG. 12 is a block diagram of a portion of an optical WDM network similar to that of FIG. 10 including nodes of a further alternative structure.

Also the structure of the nodes illustrated in FIG. 12 can be easily extended to be used for bidirectional communication over more than two logical or wavelength channels.

In all examples described above any wavelength channels that have not been used for the one fiber path bidirectional connections can be used for other one fiber path bidirectional connections or for standard unidirectional WDM connections.

In all cases described above a WDM transmitter can either be a WDM transmitter such as a laser integrated with a client equipment or a part of a transmit end WDM transponder that receives its signal input optically from a client equipment.

In all cases described above a WDM receiver can either be an receiver integrated with a client equipment or a part of a receive end WDM transponder that receives an optical signal from the WDM network and re-transmits it optically to a client equipment.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

The invention claimed is:

1. An optical add/drop node for bidirectional communication on a single fiber path in an optical WDM network, the optical add/drop node comprising:

two main ports for connection in the single fiber path;

a wavelength selective add/drop filter connected between the two main ports;

an internal first drop filter connected to the wavelength selective add/drop filter and not connected in the single fiber path;

at least one receiver connected to the internal first drop filter; and at least one source connected to the internal first drop filter, the add/drop filter branching or deflecting light, arriving at the optical add/drop node on one of the two main ports and having wavelengths of first WDM channels, to the internal first drop filter, the internal first drop filter connected to branch or deflect light to said at least one receiver and to receive light from said at least one source and let it pass to the wavelength selective add/drop filter to pass the wavelength selective add/drop filter to said one of the two main ports to be issued therefrom to the single fiber path when the node is connected in an optical WDM network.

2. The optical add/drop node of claim 1, wherein the internal first drop filter is arranged to branch or deflect light of wavelengths of at least one second WDM channel included in the first WDM channels to said at least one receiver and to receive light having wavelengths of least one third WDM channel included in the first channels and not included the at least one second channel from said at least one source.

3. The optical add/drop node of claim 1, wherein the wavelength selective add/drop filter comprises a band add/drop filter.

4. The optical add/drop node of claim 1, wherein the wavelength selective add/drop filter comprises a band add/drop filter having a first band and the internal first drop filter comprises a band drop filter having a second band, the internal first drop filter deflecting light of wavelengths within the second band to said at least one receiver and receiving from said at least one source light of wavelengths outside the second band and within the first band.

5. The optical add/drop node of claim 1, further comprising an optical multiplexer and an optical demultiplexer, wherein said at least one source includes a plurality of light sources connected to the optical multiplexer and said at least one receiver includes a plurality of optical receivers connected to the optical demultiplexer.

6. The optical add/drop node of claim 1, wherein said at least one source includes an internal second drop filter connected to at least one receiver and to at least one source.

7. The optical add/drop node of claim 1, wherein two band add/drop filters having the first band are connected between the two main ports, a first one of the band add/drop filters branching or deflecting light, arriving at the optical add/drop node on a first one of the two main ports and a second one of the band add/drop filters branching or deflecting light, arriving at the optical add/drop node on a second one of the two main ports.

8. The optical add/drop node of claim 7, wherein the two band add/drop filters are included in a single Bragg grating Mach-Zehnder interferometric filter.

9. The optical add/drop node of claim 7, wherein the two band add/drop filters are included in a single device comprising a Bragg grating connected between two optical circulators.

10. An optical WDM network comprising a plurality of add/drop nodes connected by two or more parallel optical fiber paths, wherein bidirectional communication channels are arranged between pairs of the add/drop nodes over links, the bidirectional communication channel between each of the pairs of add/drop nodes being part of one of the two or more optical fiber paths and carried on two different WDM wavelength channels on a single fiber path, a different channel for each direction, each of the optical add/drop nodes comprising two main ports connected in the single fiber path;

a wavelength selective add/drop filter connected between the two main ports;

an internal first drop filter connected to the wavelength selective add/drop filter and not connected in the single fiber path;

at least one receiver connected to the internal first drop filter; and at least one source connected to the internal first drop filter;

the wavelength selective add/drop filter of each of the optical add/drop nodes branching or deflecting light, arriving at the optical add/drop node on one of the two main ports thereof and having wavelengths of first WDM channels, to the internal first drop filter of the optical add/drop node, the internal first drop filter connected to branch or deflect light to said at least one receiver of the optical add/drop node and to receive light from said at least one source of the optical add/drop node and let it pass to the wavelength selective add/drop filter of the optical add/drop node to pass the wavelength selective add/drop filter of the optical add/drop node to said one of the two main ports of the optical add/drop node to be issued therefrom to the single fiber path.

11. The optical WDM network of claim 10, wherein the wavelengths of the two wavelength channels used for the bidirectional communication channel between the add/drop nodes of each of said pairs are added/dropped in each add/drop node by one wavelength selective add/drop filter.

12. The optical WDM network of claim 10, wherein the two or more parallel optical fiber paths form closed rings and the links are selected to be parts of suitable ones of the two or more parallel optical fiber paths so that the highest loss of traffic in the closed rings becomes as low as possible.

13. The optical WDM network of claim 10, wherein the plurality of add/drop nodes comprises a main node and a plurality of satellite nodes, a bidirectional communication channel arranged between the main node and each of the satellite nodes on at least one of the two or more parallel optical fiber paths, the bidirectional communication channel between the main node and each one of the satellite nodes carried on two different WDM wavelength channels on a single fiber path, the two different WDM wavelength channels used by one satellite node being separate from the two different WDM wavelength channels used by any other satellite node communicating with the main node on the same one of the two or more parallel optical fiber paths.

14. The optical WDM network of claim 13, wherein the main node is connected to the two ends of each of the two or more parallel optical fiber paths, thereby forming rings that may be interrupted at the main node, wherein each of the rings includes a first section and a second section connected respectively to first and second sides of the main node, each of the satellite nodes arranged for bidirectional communication with the main node on only one of the two or more parallel optical fiber paths, and on each of the first and second sections of said one of the two or more parallel optical fiber paths in which the one of the two or more parallel optical fiber paths is divided by the satellite node and the main node.

15. The optical WDM network of claim 14, wherein the satellite nodes are arranged to use for the bidirectional communication on the first section of the rings the same two different WDM wavelength channels which are also used for the bidirectional communication on second section of the rings.

16. The optical WDM network of claim 10, wherein the two different WDM wavelength channels used by a first pair of add/drop nodes communicating with each other on one of the two or more parallel optical fiber paths are separate from the two different WDM wavelength channels used by at least a second other pair of add/drop nodes communicating with each other on the same one of the two or more parallel optical fiber paths.

17. The optical WDM network of claim 10, wherein each of the two or more parallel optical fiber paths is connected to form a closed ring, the closed ring having a right section and a left section which are complementary to each other, a pair of the add/drop nodes arranged for bidirectional communication with each other on one of the two or more parallel optical fiber paths and on each of the two complementary right and left sections of said one of the two or more parallel optical fiber paths in which the one of the two or more parallel optical fiber paths is divided by the pair of add/drop nodes.

18. The optical WDM network of claim 17, wherein the add/drop nodes of the pair are arranged to use, for the bidirectional communication on the two complementary right and left sections, the same two different WDM wavelength channels.

19. The optical WDM network of claim 10, wherein a portion of said one of the two or more parallel optical fiber paths which is used for the bidirectional communication between a first pair of the add/drop nodes has no part in common with another portion of said one of the two or more parallel optical fiber paths which is used for the bidirectional communication channel between a second and different pair of the add/drop nodes, wherein the two different WDM wavelength channels used for the bidirectional communication channel between the first pair of the add/drop nodes also being used for the bidirectional communication channel between the second pair of the add/drop nodes.

20. The optical add/drop node of claim 1, wherein the internal first drop filter comprises a band drop filter.

21. The optical add/drop node of claim 1, wherein said at least one receiver includes an internal second drop filter connected to at least one receiver and to at least one source.

22. The optical WDM network of claim 10, wherein the wavelengths of the two wavelength channels used for the bidirectional communication channel between the add/drop nodes of each of said pairs are added/dropped in each add/drop node by one band add/drop filter.

* * * * *